Oct. 5, 1971        R. D. JOY ET AL        3,610,038
                      WAVE METER
Filed June 30, 1970                    2 Sheets-Sheet 1
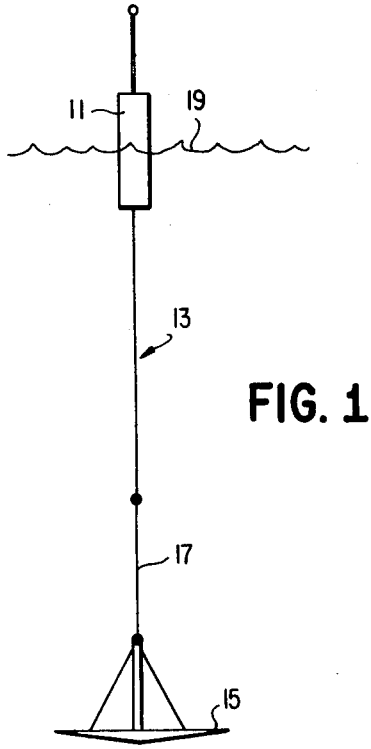
FIG. 1
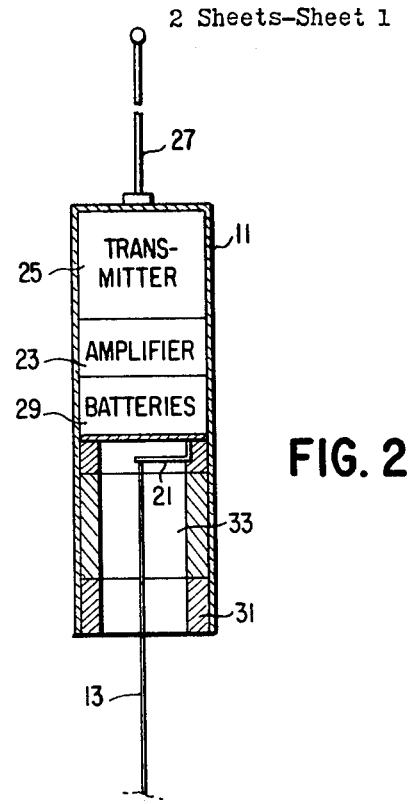
FIG. 2
FIG. 3
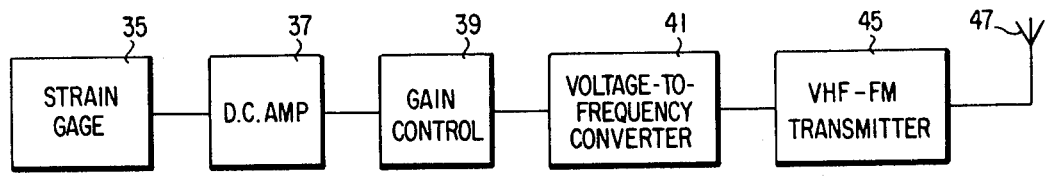
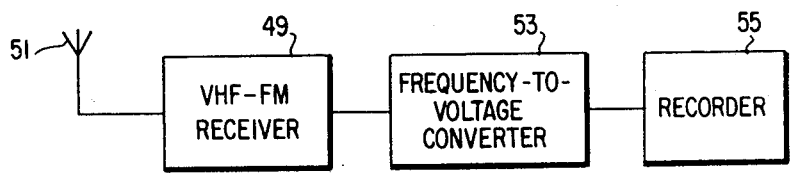
FIG. 4
INVENTORS
ROBERT D. JOY
RUSSELL F. COLTON
BY *Griffin, Branigan & Kindness*
ATTORNEYS

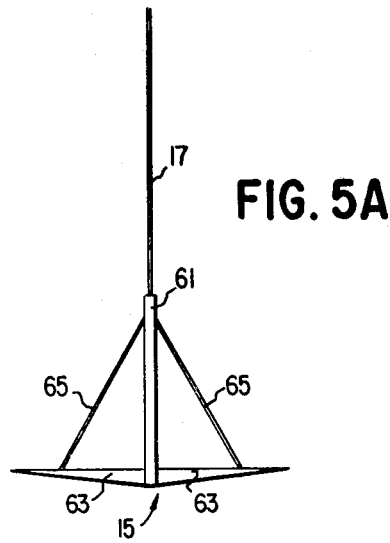
FIG. 5A
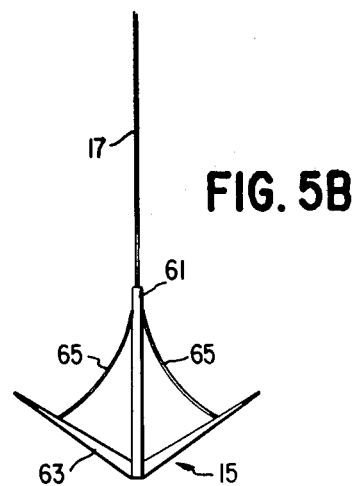
FIG. 5B
FIG. 6
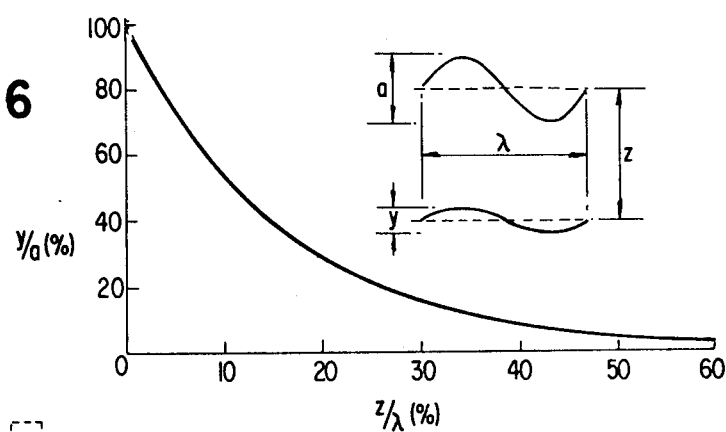
FIG. 7
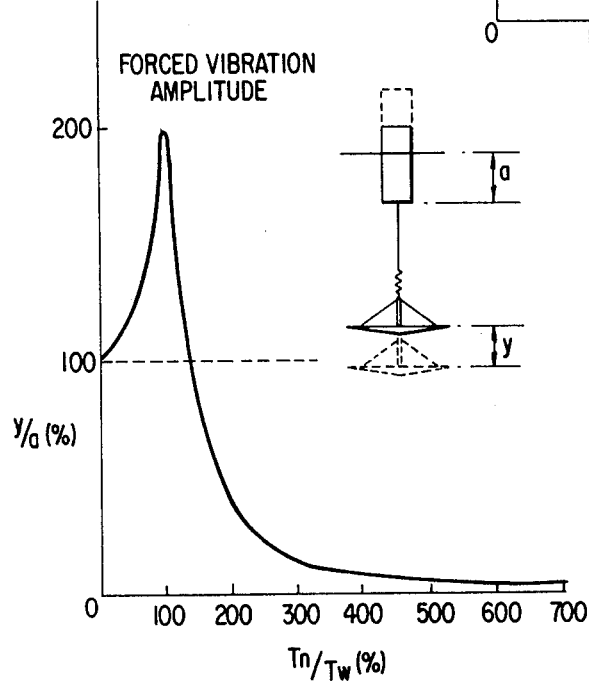
INVENTORS
ROBERT D. JOY
RUSSELL F. COLTON
BY *Griffin, Branigan & Kindness*
ATTORNEYS 3,610,038
WAVE METER
Robert D. Joy and Russell F. Colton, Cedar Rapids, Iowa, assignors to J-Tec Associates, Incorporated, Cedar Rapids, Iowa
Filed June 30, 1970, Ser. No. 51,222
Int. Cl. B63b 21/52
U.S. Cl. 73—170 A                    16 Claims

ABSTRACT OF THE DISCLOSURE

A wave meter comprises a surface float, an inter-connecting cable that is elastic along a portion of its length and a reference plate. The inter-connecting cable connects the surface float to the reference plate which is suspended below the surface deep enough so that it is immune to water particle motion caused by surface waves. The reference plate operates on an umbrella principle whereby it expands at its deep location to create a relatively large virtual mass. Inside of the surface float, the inter-connecting cable is attached to a strain gage. The strain gage modifies a DC voltage which is converted into a frequency variable signal that is then transmitted to a remote receiver by a transmitter located inside of the surface float, via an antenna located on top of the surface float.

BACKGROUND OF THE INVENTION

This invention relates to wave meters and more particularly to a wave meter that is suitable for measuring the height and periodicity of ocean waves, particularly in the deeper parts of the ocean.

Various types of instruments for measuring the height and periodicity of ocean waves have been proposed and are in use. In shallow water many of these devices comprise towers which are affixed to the floor of the ocean by anchors or other suitable means. The towers house instruments that measure the periodicity and height variations of waves as they flow by the towers. While such devices are suitable for use in relatively shallow water, they are unsuitable for use in deep water where it is impractical to mount a suitably rigid tower.

Various other types of apparatus for measuring the height and periodicity of waves have been proposed for use in the deeper parts of the ocean. In general, these devices include some sort of anchoring means connected to a float or buoy via a cable. A wave measuring instrument is either housed in the anchor or in the buoy and provides information about the height and periodicity of the waves passing the buoy. This information is either recorded or telemetered to a remote location. In many such prior art structures pressure sensing devices are utilized to provide the desired information.

In other such prior art structures, movable vanes are attached to the anchoring means. The vanes rotate or move as the buoy moves up and down; and the degree of rotation or movement provides a signal related to the height and periodicity of the waves. But these devices are not entirely satisfactory for a variety of reasons. In general, they are often complicated to construct and use. In addition, the height of the waves that they can measure is often limited. Further, they often must be deployed from surface vessels as opposed to aircraft.

A more recently proposed device comprises a reference plate attached to one of a cable. The reference plate is generally flat and horizontally deployed to provide a relatively high virtual mass. The other end of the cable is attached to one end of a highly flexible relatively long coil spring; and the other end of the coil spring is connected to the wiper arm of a potentiometer mounted in a surface float. The surface float houses suitable electronics for transmitting a potentiometer modified signal. While this structure constitutes an improvement over other prior art devices, it also has certain disadvantages. For example, because the reference plate is relatively large in diameter, the device is usually deployed from a surface vessel. That is, aircraft deployment, particularly from relatively high altitudes, is difficult if not impossible. In addition, the springs required by this structure are relatively expensive because of their nature and because they must withstand ocean corrosion. Moreover, these springs are relatively difficult to store prior to deployment from the overall structure because they are long and extremely flexible. One further disadvantage of this structure is that the cable connecting the coil spring to the potentiometer must pass through a water tight opening in the float because the potentiometer is sensitive to ocean water.

Therefore, it is an object of this invention to provide a new and improved wave meter.

It is another object of this invention to provide a wave meter that is relatively stable without being anchored to the bottom under the water in which the waves are being sensed.

It is a further object of this invention to provide a wave meter that includes a sensor that is relatively immune to ocean water, is compact prior to deployment, and is inexpensive to manufacture and use.

It is a further object of this invention to provide a new and improved wave meter suitable for measuring the wave height and periodicity of ocean waves over a wide range while remaining relatively uncomplicated and suitable for deployment from aircraft as well as surface vessels.

SUMMARY OF THE INVENTION

In accordance with principles of this invention a wave meter comprises a surface float, an inter-connecting cable, and a reference plate. The inter-connecting cable is foldable and elastic along a portion of its length. The reference plate is umbrella-formed whereby it is easily stored, yet extendable when it reaches its operative position at the lower end of the inter-connecting cable, well beneath the surface of the waves. More specifically, when deployed, the reference plate is suspended below the surface of the waves deep enough so that it is relatively immune to the water particle motion which is caused by the waves on the surface. The surface float houses a strain gage which is connected to the other end of the inter-connecting cable. The strain gage modifies a DC signal which is applied to a transmitter for transmission to suitable receiving and recording means.

Because the wave meter employs an expandable umbrella-type reference plate, it can be compactly stored. In addition, because it uses a foldable, elastic cable, preferably formed of rubber as opposed to a spring, the inter-connecting means between the surface float and the reference plate is also easily stored. Preferably, both of these items are stored inside of the surface float prior to deployment whereby an easily handled structure is provided. It will be appreciated that such a structure is deployable from high flying aircraft as well as surface vessels. In addition, because the sensing element is a strain gage, as opposed to a potentiometer or other sensor, the effect of ocean water is alleviated. That is, the line connecting the strain gage to the reference plate does not necessarily have to pass through an opening that prevents the entrance of sea water into the float.

Hence, it will be appreciated from the foregoing brief summary that the invention provides a wave meter for overcoming problems of the above described prior art wave meters.

BRIEF DESCRIPTION OF THE DRAWINGS

The foregoing objects and many of the attendant advantages of this invention will become more readily appreciated as the invention becomes better understood by reference to the following detailed description when taken in conjunction with the accompanying drawings, wherein:

FIG. 1 is a pictorial diagram illustrating a preferred embodiment of the invention;

FIG. 2 is a cross-sectional diagram illustrating a buoy formed in accordance with the invention, FIG. 3 is a block diagram illustrating a transmitter system formed in accordance with the invention;

FIG. 4 is a block diagram illustrating a receiver system formed in accordance with the invention for receiving signals from a transmitter system of the type illustrated in FIG. 3;

FIGS. 5A and 5B are pictorial diagrams more precisely illustrating a reference plate formed in accordance with the invention;

FIG. 6 is a first graph utilized to describe the operation of the invention; and FIG. 7 is a second graph utilized to describe the operation of the invention.

DESCRIPTION OF THE PREFERRED EMBODIMENT

Turning now to the drawings wherein like reference numbers refer to like parts throughout the several views, FIG. 1 illustrates the preferred embodiment of the invention which comprises a surface float 11, an inter-connecting line 13, and a reference plate 15. Forming part of the inter-connecting line 13 is a foldable elastic section 17 which may be formed of rubber, for example. The inter-connecting line 13 is connected between the surface float 11 and the reference plate 15 with the elastic region 17 being located near the reference plate 15.

In accordance with the following more completely described theory of operation of the invention, the surface float follows the waves 19 on the surface of the ocean and is elastically connected to the reference plate by means of the foldable elastic section 17 of the inter-connecting line 13. The reference plate is suspended deep enough below the surfaces float so that it is immune to the water particle motion caused by waves on the surface; and in this regard, it should be appreciated that water particle motion reduces exponentially with wavelength. Moreover, by the time the reference plate is half a wavelength below the surface of the water, particle motion is less than about 4%.

The increase and decrease in the stress on the inter-connecting line 13 caused by the expansion and contraction of the elastic member 17 as the float 11 moves up and down is utilized to measure wave height. The rate of up and down movement is used to measure the periodicity of the waves.

FIG. 2 is a cross-sectional view of a float 11 formed in accordance with the invention. The float 11 houses a strain gage force transducer 21 connected to the upper end of the interconnecting line 13. As the float moves up and down, the strain placed on the strain gage force trandsucer 21 is increased and decreased. This signal is amplified by a suitable amplifier 23 and transmitted by a suitable transmitter 25 and a whip antenna 27 to a remote receiver. Batteries 29 supply power for the overall system.

The housing for the float 11 is cylindrical and includes a ballast region 31 located at its bottom. A reel and plate compartment 33 is located in the center of the float 11 inside of the ballast region 31. The reel and plate compartment 33 houses the inter-connecting line 13, including the elastic region 17, and the reference plate 15, folded in the manner hereinafter described. In other words, prior to deployment the entire system is housed inside of a cylindrical container which, in one actual embodiment of the invention, is about 6 inches in diameter and 36 inches long. Hence, prior to deployment, the overall unit is very compact.

FIGS. 3 and 4 respectively illustrate suitable transmitter and receiver systems for transmitting and receiving the signal created by the strain gage. More specifically, FIG. 3 illustrates a strain gage 35 connected to a DC amplifier 37. The output from the DC amplifier is connected through a gain control circuit 39 to the input to a voltage-to-frequency converter 41. The output from the voltage-to-frequency converter 41 is connected via a VHF–FM transmitter 45 to an antenna 47. In operation, the strain gage signal 35 is DC amplified by the DC amplifier 37. Thereafter, the signal level is controlled by the gain control circuit 39. The output from the gain control circuit which is also a DC signal, is applied to the voltage-to-frequency converter wherein it is converted to a frequency variable signal. The frequency variable signal is then transmitted by the VHF–FM transmitter 45 and the antenna 47.

A receiver system illustrated in FIG. 4 comprises a VHF–FM receiver 49 having its input connected to an antenna 51. The output from the VHF–FM receiver is connected through a frequency-to-voltage converter 53 to a recorder 55. Hence, the incoming signal is received by the VHF–FM receiver 49, converted to a voltage signal by the frequency-to-voltage converter 53 and recorded by the recorder 55.

As illustrated in FIGS. 5A and 5B, the reference plate 15 generally comprises a center cylindrical element 61 that is connected to the lower end 17 of the inter-connecting line 13. Located at the other end of the center element 61 are umbrella portions 63 of the reference plate. In this regard, prior to deployment the umbrella portions are folded alongside of the center element 61 to fit inside of the reel and plate compartment 33. Struts or cables 65 extend downwardly and outwardly from the center element to maintain the umbrella portions 63 in a generally horizontal plane when they are fully deployed.

In operation, when the reference plate 15 is first deployed from the surface float 11, the umbrella portions 63 remain adjacent to the center element 61. When the inter-connecting cable 13 is fully extended, however, the upward motion caused by the waves acting on the surface float or a self erecting mechanism causes the umbrella portions 63 to open as illustrated in FIG. 5B until fully deployed as illustrated in FIG. 5A.

Turning now to a description of the theory of operation of the invention, simple wave theory discloses that the amplitude of particle motion decreases exponentially with depth as illustrated by FIG. 6 which is plotted in accordance with the following formula:

$$y/a = e^{-2\pi z/\lambda} \quad (1)$$

where:

$y=$ particle motion amplitude at the depth of the reference plate;
$a=$ surface wave amplitude;
$z=$ depth of the reference plate; and
$\lambda=$ incident wavelength on the surface.

In other words, FIG. 6 demonstrates that particle motion, as a percentage of surface wave amplitude, decreases with an increase of depth as a percentage of wavelength.

Simple wave theory also discloses that the wave period $T_w$ is equal to:

$$\sqrt{2\pi\lambda/g} \text{ or } (2\pi\lambda/g)^{\frac{1}{2}} \quad (2)$$

One important characteristic of the inventive system is the virtual mass which the reference plate sees. This mass is called a virtual mass because it is not a real mass—in other words it cannot be measured on a balance. But when there are acceleration forces, it acts as though it were a mass ($m_v$) of the magnitude given in the following expression:

where:

$$m_v = \rho d^3/3 \quad (3)$$

$\rho$ = density of water; and
$d$ = plate diameter.

It will be appreciated from the foregoing discussion that the virtual mass provided by the umbrella reference plate is very high when the plate has a large diameter. Hence, the plate tends to remain extremely stable when the invention is used in sufficiently deep parts of the ocean. Moreover, because of its foldable nature it is capable of having a much large diameter than prior art devices so as to result in a much greater virtual mass even though its undeployed size is much less.

The general equation for natural period $T_n$ of an elastic spring-mass system is as follows:

where:

$$T_n = 2\pi\sqrt{m/k} \quad (4)$$

$m$ = mass; and
$k$ = spring constant of the elastic system.

The mass ($m$) for the natural period of the wave meter of the invention is equal to $m_v + m_p$ where $m_p$ is the actual mass of the system. In this regard, in one practical embodiment the natural period for a wave meter of the invention was determined to be approximately 100 seconds, which is very long with respect to normal wavelengths.

FIG. 7 is a graph illustrating, for a forced-vibration oscillating system, the manner in which the amplitude ratio ($y/a$) changes with the ratio of the natural peroid to the imposed period ($T_n/T_w$). For normal wavelengths in water, the periods ($T_w$) seldom get over 20 seconds and in most cases, are between 10 and 15 seconds. Hence, resulting $T_n/T_w$ ratios are greater than 500%. In other words, the amplitude of the change at the reference plate are very small. Moreover, because the amplitude changes are to the right of the resonant point illustrated in FIG. 7 they are out of phase with the wave motion whereby they tend to cancel out any motion made by water particles. It will be appreciated, therefore, that because the amplitude changes caused by movement of the reference plate are very small and because they tend to be cancelled, very little error is introduced into the resultant strain gage signal by the action of the reference plate.

It will be appreciated from the foregoing description that the invention provides a rather uncomplicated system for measuring the height and periodicity of ocean waves. If desired, the invention can even be used to measure waves exceeding 20 feet in height. Obviously, to some extent, the length of the elasticity section 17 of the inter-connecting cable 13 will depend upon the contemplated wave height to be measured. However, it can vary over a wide range. While it has been found that for static signals, i.e., a calm sea, the use of rubber as the elastic section is not particularly satisfactory for measurement purposes; when the sea waves become slightly larger in height, rubber provides good results that are relatively linear over a reasonably wide range. And, it is under these conditions that the invention is most useful.

It will be appreciated from the foregoing description that the invention overcomes many prior art problems by providing a compact, easily deployable wave meter. The system can be compactly stored in a single cylindrical canister prior to being deployed. Moreover, it provides a sensing element, i.e., a strain gage that is unaffected by sea water. In other words, the interconnecting cable connecting the strain gage to the reference plate does not have to pass through a sealed opening which has been previously required by prior art system using potentiometers. Moreover, the invention does not use an expensive spring. For both of these reasons, the cost of producing a wave meter made in accordance with the invention is greatly reduced over the cost of producing prior art wave meters.

The embodiments of the invention in which an exclusive property or privilege is claimed are defined as follows:

1. A wave meter comprising in combination:
   a surface float suitable for housing a force sensing transducer;
   a force sensing transducer mounted in said surface float;
   an inter-connecting cable having one end connected to said force sensing transducer, said inter-connecting cable including an elastic section that expands under the application of force along the length of said inter-connecting cable; and
   a reference plate including:
      a center portion connected to the other end of said inter-connecting cable; and,
      an umbrella-like portion adapted to be unfolded from a position adjacent said center element to a position that lies in a plane essentially at right angles to said center element.

2. A wave meter as claimed in claim 1 wherein said force transducer is a strain gage.

3. A wave meter as claimed in claim 1 wherein said elastic section is formed of a foldable material.

4. The apparatus of claim 3 wherein said foldable material is rubber.

5. A wave meter as claimed in claim 3 wherein said force transducer is a strain gage.

6. A wave meter as claimed in claim 5 wherein said surface float is generally cylindrical in shape, includes a ballast lower region that surrounds a reel and plate compartment wherein said inter-connecting cable and said reference plate are storable.

7. A wave meter as claimed in claim 6 wherein said surface float also houses a transmitting system having its input connected to said strain gage and having its output connected to an antenna that projects upwardly from the top of said surface float.

8. A wave meter comprising in combination:
   a surface float suitable for housing a force sensor;
   a strain gage force sensing transducer mounted in said surface float;
   an inter-connecting cable having one end connected to said strain gage force sensing transducer, said inter-connecting cable including an elastic region; and,
   a reference plate connected to the other end of said inter-connecting cable and including a section that is in a plane at relatively right angles to the direction of said inter-connecting cable.

9. A wave meter as claimed in claim 8 wherein said elastic section is formed of a foldable material.

10. The wave meter of claim 9 wherein said foldable material is rubber.

11. A wave meter as claimed in claim 8 wherein said reference plate is deployable in an umbrella fashion from a position where it is adjacent to a cylindrical section connected to the other end of said inter-connecting cable to a position where it is in a plane that is essentially at right angles to said central section.

12. A wave meter as claimed in claim 11 wherein said elastic section is formed of a foldable material.

13. The wave meter of claim 12 wherein said foldable material is rubber.

14. A wave meter comprising in combination:
   a surface float suitable for housing a force sensor;
   a force sensing transducer mounted in said surface float;
   an inter-connecting cable connected at one end to said force sensing transducer and having an elastic section formed of a foldable material that is stretchable; and,
   a reference plate connected to the other end of said inter-connecting cable.

15. The wave meter of claim 14 wherein said foldable material is rubber.

16. A wave meter as claimed in claim 14 wherein said force sensing transducer is a strain gage force transducer and wherein said surface float is cylindrical in shape and houses a transmitter having its input connected to said force sensing transducer and its output connected to an antenna that projects upwardly from the top of said surface float.

References Cited

UNITED STATES PATENTS 3,329,015   7/1967   Bakke et al. _____ 73—170 A

JERRY W. MYRACLE, Primary Examiner

U.S. Cl. X.R.

9—8 R